(12) United States Patent
Georgescu et al.

(10) Patent No.: US 11,403,861 B2
(45) Date of Patent: Aug. 2, 2022

(54) AUTOMATED STAIN FINDING IN PATHOLOGY BRIGHT-FIELD IMAGES

(71) Applicant: Leica Biosystems Imaging, Inc., Vista, CA (US)

(72) Inventors: Walter Georgescu, San Marcos, CA (US); Bharat Annaldas, Oceanside, CA (US); Allen Olson, San Diego, CA (US); Kiran Saligrama, San Diego, CA (US)

(73) Assignee: LEICA BIOSYSTEMS IMAGING, INC., Vista, CA (US)

( * ) Notice: Subject to any disclaimer, the term of this patent is extended or adjusted under 35 U.S.C. 154(b) by 424 days.

(21) Appl. No.: 15/761,038

(22) PCT Filed: Sep. 16, 2016

(86) PCT No.: PCT/US2016/052331
§ 371 (c)(1),
(2) Date: Mar. 16, 2018

(87) PCT Pub. No.: WO2017/049226
PCT Pub. Date: Mar. 23, 2017

(65) Prior Publication Data
US 2018/0260609 A1    Sep. 13, 2018

Related U.S. Application Data

(60) Provisional application No. 62/219,526, filed on Sep. 16, 2015.

(51) Int. Cl.
*G06K 9/00* (2006.01)
*G01N 1/30* (2006.01)
(Continued)

(52) U.S. Cl.
CPC ............. *G06V 20/698* (2022.01); *G01N 1/30* (2013.01); *G01N 21/64* (2013.01); *G06T 7/0012* (2013.01);
(Continued)

(58) Field of Classification Search
CPC . G06T 2207/10056; G06T 2207/30024; G06T 7/0012; G06T 7/90; G06K 9/00127; G06K 9/4652; G06K 2009/4657
See application file for complete search history.

(56) References Cited

U.S. PATENT DOCUMENTS 6,640,000 B1    10/2003  Fey et al.
2003/0231791 A1  12/2003  Torre-Bueno et al.
(Continued)

FOREIGN PATENT DOCUMENTS

CN    108140104 A    6/2018
JP    6605716 B2    11/2019
(Continued)

OTHER PUBLICATIONS

Ruifrok, Arnout C., and Dennis A. Johnston. "Quantification of histochemical staining by color deconvolution." Analytical and quantitative cytology and histology 23.4 (2001): 291-299. (Year: 2001).*

(Continued)

*Primary Examiner* — Vincent Rudolph
*Assistant Examiner* — Raphael Schwartz
(74) *Attorney, Agent, or Firm* — Knobbe, Martens, Olson & Bear LLP (57) ABSTRACT

Automated stain finding. In an embodiment, an image of a sample comprising one or more stains is received. For each of a plurality of pixels in the image, an optical density vector for the pixel is determined. The optical density vector comprises a value for each of the one or more stains, and (Continued)

represents a point in an optical density space that has a number of dimensions equal to a number of the one or more stains. The optical density vectors are transformed from the optical density space into a representation in a lower dimensional space. The lower dimensional space has a number of dimensions equal to one less than the number of dimensions of the optical density space. An optical density vector corresponding to each of the one or more stains is identified based on the representation.

14 Claims, 7 Drawing Sheets

(51) Int. Cl.
    *G01N 21/64*     (2006.01)
    *G06T 7/00*     (2017.01)
    *G06V 20/69*     (2022.01)

(52) U.S. Cl.
    CPC ............ *G06V 20/69* (2022.01); *G06V 20/693* (2022.01); *G06T 2207/30004* (2013.01)

(56) References Cited

U.S. PATENT DOCUMENTS

| | | | |
|---|---|---|---|
| 2005/0266395 A1 | 12/2005 | Gholap et al. | |
| 2007/0026525 A1* | 2/2007 | Marcelpoil | G06T 7/0012 436/63 |
| 2015/0293941 A1 | 10/2015 | Eichhorn | |
| 2016/0098590 A1 | 4/2016 | Bredno et al. | |

FOREIGN PATENT DOCUMENTS

| | | |
|---|---|---|
| WO | 2014/195193 A1 | 12/2014 |
| WO | WO2014/195193 A1 | 12/2014 |
| WO | WO 2017/0049226 A1 | 3/2017 |

OTHER PUBLICATIONS

Principal Component Analysis (Wikipedia: the free encyclopedia), https://en.wikipedia.org/w/index.php?title=Principal_component_analysis&oldid=664939197, May 31, 2015 (Year: 2015).*

Chan, Tsung-Han, et al. "A convex analysis-based minimum-volume enclosing simplex algorithm for hyperspectral unmixing." IEEE Transactions on Signal Processing 57.11 (2009): 4418-4432. (Year: 2009).*

Chan, Raymond H., Chung-Wa Ho, and Mila Nikolova. "Salt-and-pepper noise removal by median-type noise detectors and detail-preserving regularization." IEEE Transactions on image processing 14.10 (2005): 1479-1485. (Year: 2005).*

Extended European Search Report dated May 2, 2019 for related European Patent Application No. 16847494.8, in 6 pages.

Notification of Reasons for Refusal dated May 8, 2019 for related Japanese Patent Application No. 2018-513596 and corresponding English translation, in 19 pages.

M. Gavrilovic et al. "Blind Color Decomposition of Histological Images," IEEE Transactions on Medical Imaging, vol. 32, No. 6, Jun. 2013.

M.E. Winter, "N-FINDER: An Algorithm for Fast Autonomous Spectral End-Member Determination in Hyperspectral Data," Department of Earth Sciences, University of Queensland (Australia) and Technical Research Associates, Inc. (USA), Proc. SPIE, vol. 3753, pp. 266-275, (1999).

A. Ifarraguerri and C.I. Chang, "Multispectral and Hyperspectral Image Analysis with Convex Cones," IEEE Transactions on Geoscience and Remote Sensing, vol. 37, No. 21, pp. 756-770, (Mar. 1999).

J.W. Boardman, "Automating Spectral Unmixing of AVIRIS Data Using Convex Geometry Concepts," Fourth JPL Airborne Geoscience Workshop, vol. 1, No. 93-26, pp. 11-14 (1993).

J.W. Boardman et al., "Mapping Target Signatures via Partial Unmixing of AVIRIS Data," Summ. VI JPL Airborne Earth Sci. Work, vol. 95-1, pp. 23-26 (1995).

R. Neville et al., "Automatic Endmember Extraction from Hyperspectral Data for Mineral Exploration," Presented at the Fourth International Airborne Remote Sensing Conference and Exhibition, 21st Canadian Symposium on Remote Sensing, Ottawa, Ontario, Canada, pp. 1-8 (Jun. 1999).

J.H. Bowles et al., "Use of Filter Vectors in Hyperspectral Data Analysis," Proc. SPIE, vol. 2553, pp. 148-157 (1995).

A. Plaza et al., "Spatial/Spectral Endmember Extraction by Multi-dimensional Morphological Operations," IEEE Transactions on Geoscience and Remote Sensing, vol. 40, No. 9, pp. 2025-2041 (Sep. 2002).

C. A. Bateson et al., "Endmember Bundles: A New Approach to Incorporating Endmember Variability into Spectral Mixture Analysis," IEEE Transactions on Geoscience and Remote Sensing, vol. 38, No. 2, pp. 1083-1094 (Mar. 2000).

P.V. Pauca et al., "Nonnegative Matrix Factorization for Spectral Data Analysis," Linear Algebr. Appl., vol. 416, No. 1, pp. 29-47 (2006).

P. Paatero and U. Tapper, "Positive Matrix Factorization: A Non-Negative Factor Model with Optimal Utilization of Error Estimates of Data Values," Environmetrics, University of Helsinki, Department of Physics, Siltavuorenpenger 20 D, SF-00170 Helsinki, Finland, vol. 5, No. 2, pp. 111-126 (1994).

L. Parra et al., "Unmixing Hyperspectral Data," Adv. Neural Inf. Process 12, pp. 942-948 (2000).

A. Rabinovich et al., "Unsupervised Color Decomposition of Histologically Stained Tissue Samples," NIPS, p. AP13 (2003).

J. Newberg and R.F. Murphy, "A Framework for the Automated Analysis of Subcellular Patterns in Human Protein Atlas Images," Journal of Proteome Research, vol. 7, No. 6, pp. 1-9 (Apr. 2008).

M. Macenko et al., "A Method for Normalizing Histology Slides for Quantitative Analysis," Conference Paper in Proceedings / IEEE International Symposium on Biomedical Imaging: From Nano to Macro. IEEE International Symposium on Biomedical Imaging, pp. 1-5 (Jan. 2009).

M.T. McCann et al., "Algorithm and Benchmark Dataset for Stain Separation in Histology Images," Proceedings IEEE International Conference, Image Process, pp. 1-5 (2014).

J.O'Rourke et al., "An Optimal Algorithm for Finding Minimal Enclosing Triangles," Journal of Algorithms, vol. 7, No. 2, pp. 258-269 (1986).

International Search Report and Written Opinion for related PCT Application No. PCT/US2016/52331, dated Dec. 8, 2016.

Office Action dated May 6, 2021; Chinese Application No. 201680053670.7, filed Mar. 16, 2018; in 11 pages.

Gavrilovic, et al; Blind Color Decomposition of Histological Images; IEEE Transactions on Medical Imaging, vol. 32, No. 6, Jun. 2013; 0278-0062;, in 12 pages.

Second Office Action in Chinese Application No. 201680053670.7 dated Oct. 22, 2021, in 14 pages.

\* cited by examiner

AUTOMATED STAIN FINDING IN PATHOLOGY BRIGHT-FIELD IMAGES

CROSS-REFERENCE TO RELATED APPLICATIONS

This application claims priority to U.S. Provisional Patent App. No. 62/219,526, filed on Sep. 16, 2015, and titled "Automated Stain Finding in Pathology Bright-Field Images," the entirety of which is hereby incorporated herein by reference.

BACKGROUND

Field of the Invention

The embodiments described herein are generally directed to automated stain finding, and more particularly to stain finding in pathology bright-field images.

Description of the Related Art

In order to produce accurate results, digital pathology algorithms that quantify the amounts of stain(s) in an image require an optical density value for each stain. Traditionally, optical density values have been obtained either from slides stained with a single stain, manual selection of the purest pixel of each stain in a multiple-stain image by a user via a color-picking tool, or selecting optical density values for each stain from a reference database. Each of these methods suffers from significant drawbacks.

For example, the single-stain method requires that additional samples from the same tissue be separately stained (e.g., with three additional samples for three separate stains). This greatly increases the amount of labor and time required.

Manual selection of individual stain pixels using a color-picking tool (e.g., ImageScope Eyedropper Tool™ by Indica Labs of Corrales, N. Mex.) requires a user to manually select the purest pixel for each stain in a mixed-stain image. This method suffers from accuracy and reproducibility issues. For example, it is difficult for a user, by eye, to locate the purest pixel in an image, leading to a problem with accuracy. In addition, different users will likely select different pixels as representing the purest pixel for each stain, resulting in a problem with reproducibility.

The use of a reference database to determine optical density values has similar drawbacks. For instance, there is a very low likelihood that the optical density value from a reference database matches an actual optical density value of a particular stain on a particular tissue, imaged through a particular imaging system. This results in accuracy and reproducibility problems. In addition, the image may comprise a stain which is not available in the reference database, thereby necessitating the use of a different method to obtain the optical density value.

What is needed is a means for automatically identifying stains that does not suffer from the drawbacks of conventional methods.

SUMMARY

In an embodiment, a method is disclosed. The method comprises using at least one hardware processor to: receive an image of a sample comprising one or more stains; for each of a plurality of pixels in the image, determine an optical density vector for the pixel, wherein the optical density vector comprises a value for each of the one or more stains, and wherein the optical density vector represents a point in an optical density space that has a number of dimensions equal to a number of the one or more stains; transform the optical density vectors from the optical density space into a representation in a lower dimensional space, wherein the lower dimensional space has a number of dimensions equal to one less than the number of dimensions of the optical density space; and identify an optical density vector corresponding to each of the one or more stains based on the representation.

In an additional embodiment, a system is disclosed. The system comprises at least one hardware processor; and one or more executable software modules that, when executed by the at least one hardware processor, receive an image of a sample comprising one or more stains, for each of a plurality of pixels in the image, determine an optical density vector for the pixel, wherein the optical density vector comprises a value for each of the one or more stains, and wherein the optical density vector represents a point in an optical density space that has a number of dimensions equal to a number of the one or more stains, transform the optical density vectors from the optical density space into a representation in a lower dimensional space, wherein the lower dimensional space has a number of dimensions equal to one less than the number of dimensions of the optical density space, and identify an optical density vector corresponding to each of the one or more stains based on the representation.

In an additional embodiment, a non-transitory computer-readable medium having one or more sequences of instructions stored therein. The one or more sequences of instructions, when executed by a processor, cause the processor to: receive an image of a sample comprising one or more stains; for each of a plurality of pixels in the image, determine an optical density vector for the pixel, wherein the optical density vector comprises a value for each of the one or more stains, and wherein the optical density vector represents a point in an optical density space that has a number of dimensions equal to a number of the one or more stains; transform the optical density vectors from the optical density space into a representation in a lower dimensional space, wherein the lower dimensional space has a number of dimensions equal to one less than the number of dimensions of the optical density space; and identify an optical density vector corresponding to each of the one or more stains based on the representation.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

In an embodiment, systems, methods, and media are disclosed for using geometric techniques to automatically identify separate stains in a multi-stain image, for example, by identifying optical density vectors representing pure pixels of each stain in the multi-stain image. Disclosed embodiments do not suffer from the accuracy and reproducibility problems inherent in conventional methods employed in the field of pathology, and do not need to rely on manual user input. Furthermore, in contrast to conventional methods, disclosed embodiments are able to correctly identify a stain in an image, even if the stain is not represented in a pure, unmixed state anywhere within that image.

After reading this description, it will become apparent to one skilled in the art how to implement the invention in various alternative embodiments and alternative applications. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

Process Overview

Figure 5A:
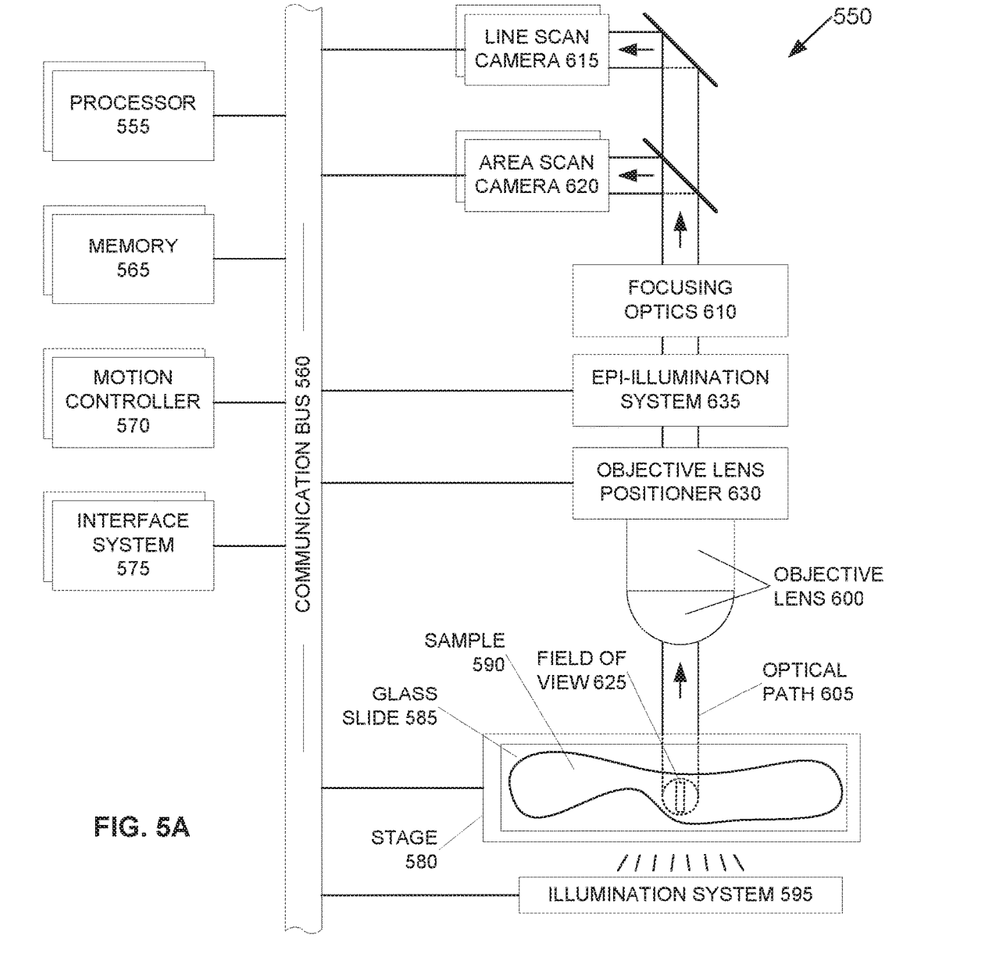
FIGS. 5A-5D illustrate a processing system on which one or more of the processes described herein may be executed, according to an embodiment.

Embodiments of process(es) for identifying stains in a multi-stain image will now be described in detail. It should be understood that the described process(es) may be embodied in one or more software modules that are executed by one or more hardware processors (e.g., processor 510 in FIG. 5). The described process may implemented as instructions represented in source code, object code, and/or machine code. These instructions may be executed directly by the hardware processor(s), or alternatively, may be executed by a virtual machine operating between the object code and the hardware processors. The instructions may be executed by hardware processor(s) in an image acquisition device, such as a slide scanner, or within a system that, either directly or indirectly, receives an image from an image acquisition device, such as a slide scanner.

In an embodiment, the process is implemented as an algorithm (e.g., a software algorithm) which analyzes an image. Prior to locating optical density vectors for an image, pixels within that image that are too dark or too bright may be removed from analysis. These pixels represent noise. Thus, if these pixels were considered during the analysis, they could result in inaccurate optical density vectors after the conversion to optical density space. Accordingly, in an embodiment, pixels whose darkness is greater than a predefined threshold and pixels whose brightness is greater than a predefined threshold may be excluded from analysis. It should be understood that these predefined thresholds may be applied to a spectrum of values from most dark (e.g., pure black) to most bright (e.g., pure white), such that, if the value of a pixel is below a lower first threshold (representing too dark) or above a higher second threshold (representing too bright), the pixel is excluded from analysis. On the other hand, if the value of the pixel is between the lower first threshold and the higher second threshold, the pixel is included in the analysis. The removal of outlying pixels from the analysis creates a noise-free environment for further analysis by the algorithm.

In an embodiment, the algorithm utilizes the assumption that stains mix in a linear fashion in the optical density space to locate the most unmixed or purest pixels from each stain in a multi-stain image of a sample. As used herein, the optical density space is defined by the number of stains represented in an image. For example, if an image is of a sample having three stains, the optical density space will be three-dimensional, with each point in the three-dimensional space representing an optical density vector comprising an optical density value for each of the three stains. Thus, if the three stains are red, green, and blue, each point in the three-dimensional optical density space will be represented by an optical density vector comprising an optical density value for the red channel, an optical density value for the green channel, and an optical density value for the blue channel. On the other hand, if an image is of a sample having two stains (e.g., red and green), the optical density space will be two-dimensional, with each point in the two-dimensional space representing an optical density vector comprising an optical density value for each of the two stains (e.g., an optical density vector comprising an optical density value for the red channel and an optical density value for the green channel). Similarly, if the image is of a sample having one stain (e.g., red), the optical density space will be one-dimensional, with each point in the one-dimensional space representing an optical density vector comprising only a single optical density value for the one stain (e.g., an optical density vector comprising an optical density value for the red channel).

In some cases, if additional color(s) are present in an image, due to non-stain elements (e.g., red blood cells), these additional color(s) may be treated the same as a stain. Thus, for example, if an image is of a sample containing red blood cells and having a green stain and a blue stain, the optical density space can be three-dimensional, with each point in the three-dimensional space representing an optical density vector that comprises an optical density value for the red channel for the red blood cells, an optical density value for the green channel for the green stain, and an optical density value for the blue channel for the blue stain.

If it is assumed that stains mix in a linear fashion, then in an image of a sample having three stains, the optical density vectors for the three pure stains will represent points defining the edges of a tetrahedron that extends to infinity. All of the other optical density vectors represented in pixels of the image will be contained within the edges of the tetrahedron. If the optical density vector for each of the three stains is extended to infinity and the tetrahedron is cut with a plane, the intersection of the tetrahedron with the plane will form a triangle. In this intersecting plane, the optical density vectors for the purest pixels have to be located at the vertices of the triangle, and the optical density vectors for all pixels representing a mixture of stains have to be inside the edges of the triangle.

Figure 1A:
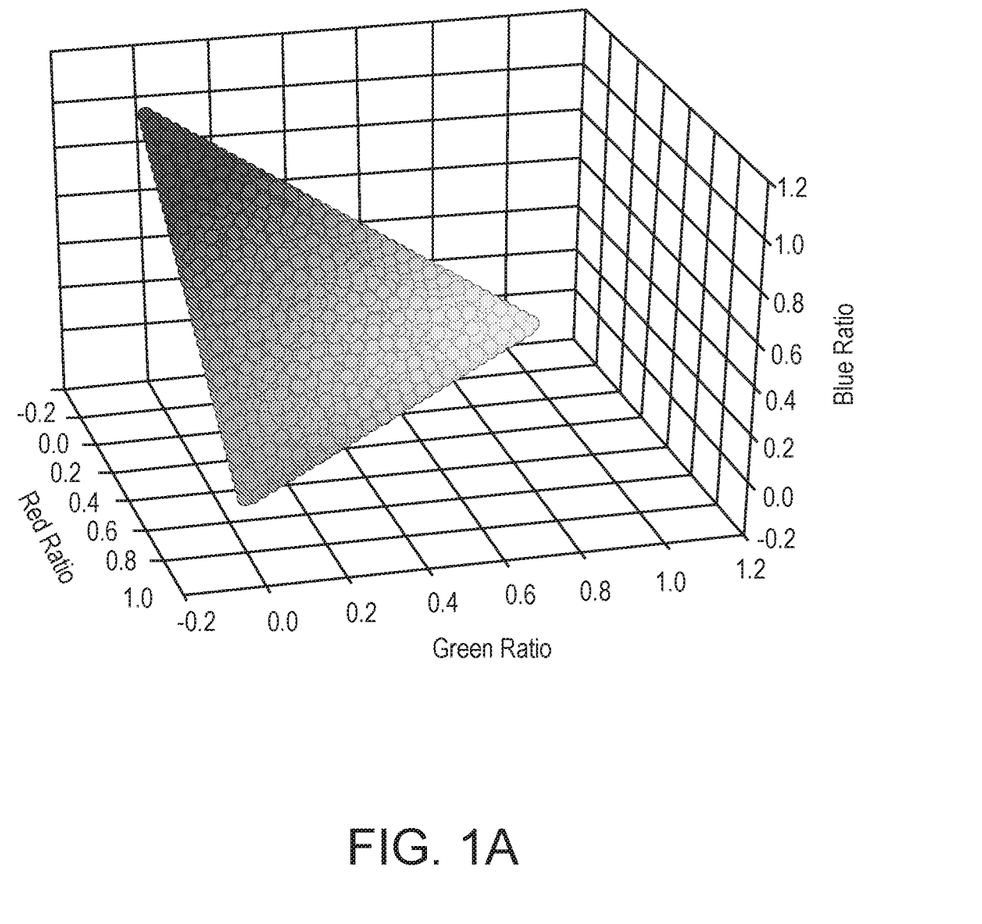
FIG. 1A illustrates an optical density space for an image representing a mixture of three stains, according to an embodiment.

FIG. 1A illustrates an optical density space for an image representing a mixture of three stains, according to an embodiment. For ease of understanding and depiction, optical density vectors have been replaced with stain ratios. In the illustrated example, the colors of the three stains are red, green, and blue. As illustrated in FIG. 1A, in a noise-free environment (e.g., excluding pixels that are too dark or too bright, as discussed above), the stain mixtures will form a triangle in the optical density space. This triangle can be transformed from the three-dimensional optical density space into a lower, two-dimensional space. Pure stains (e.g., illustrated as pure red, pure green, and pure blue) are represented by optical density vectors located at the vertices of the triangle.

Cases in which there are fewer than three stains can be generalized from the example using three stains discussed above. For example, if the image is of a sample having only two stains, the optical density vectors, as points in the optical density space, will cluster along a line, instead of a triangle. If the image is of a sample having only one stain, the optical density vectors, as points in the optical density space, will cluster around a single point. In other words, the algorithm determines a triangle for an image with three stains, a line for an image with two stains, and a point for an image with one stain.

Figure 1B:
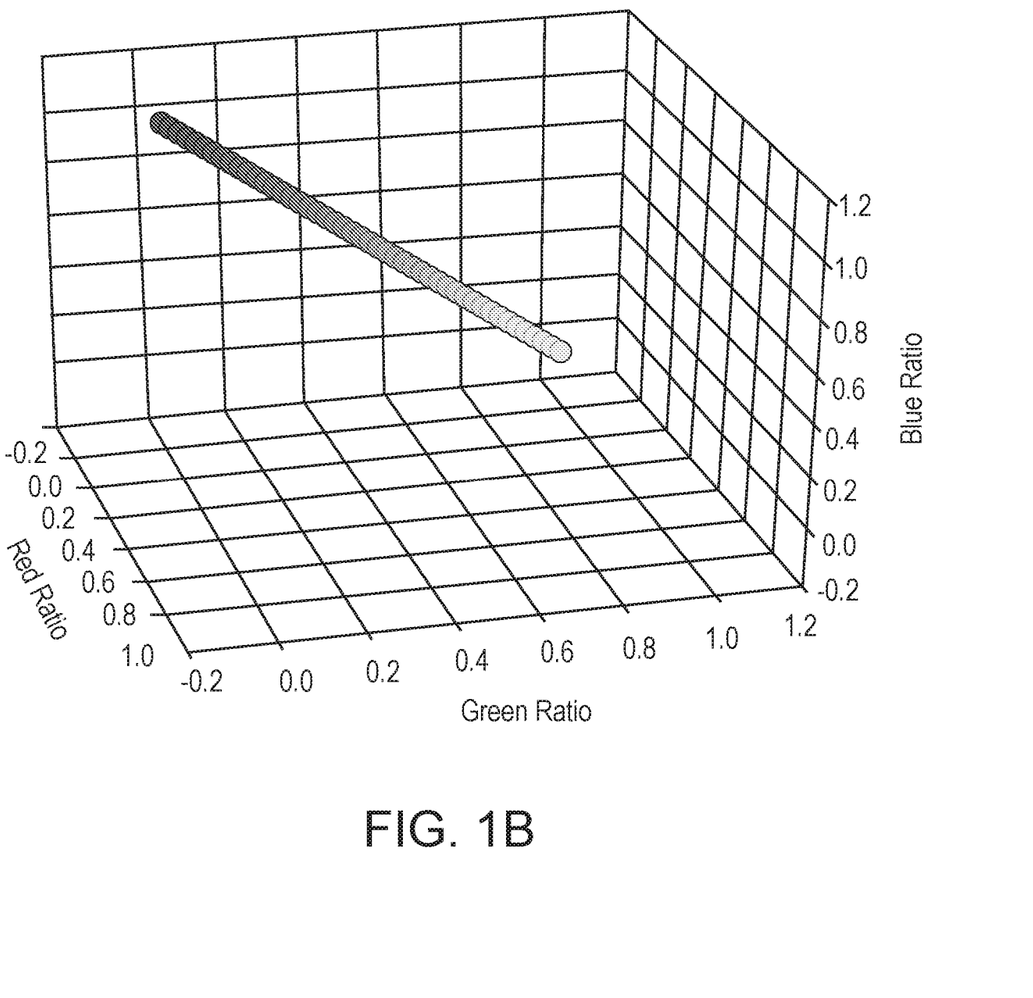
FIG. 1B illustrates an optical density space for an image representing a mixture of two stains, according to an embodiment.

FIG. 1B illustrates an optical density space for an image representing a mixture of two stains, according to an embodiment. For ease of understanding and depiction, optical density vectors have been replaced with stain ratios. In the illustrated example, the colors of the two stains are green and blue. As illustrated in FIG. 1B, in a noise-free environment (e.g., excluding pixels that are too dark or too bright, as discussed above), the stain mixtures will form around a line in the optical density space. This line can be transformed from the two-dimensional optical density space into a lower, one-dimensional space, for example, using a best fit method to determine the best-fit line. Pure stains (e.g., illustrated as pure green and pure blue) are located at the end points of the line.

The algorithm seeks to achieve its design goal in the most efficient manner possible. As discussed above, in the case of an image with a single stain, the optical density vectors will cluster around a point. In an embodiment, to find this point, the algorithm normalizes the optical density vectors to a unit length, and then computes the average of all of the optical density vectors. This average represents the point around which the optical density vectors cluster. Thus, this point is returned as the found stain.

As discussed above, in the case of an image with two stains, the optical density vectors will cluster along a line segment. In an embodiment, to find this line segment, the algorithm normalizes the optical density vectors to a unit length, calculates the mean of the optical density vectors, centers the data by subtracting the calculated mean from each optical density vector, and then projects the normalized and centered optical density vectors to the line described by the main line in regression space. Regression space refers to a best-fit representation in the optical density space (e.g., a best-fit line for two stains represented in two-dimensional optical density space, a best-fit plane for three stains represented in three-dimensional optical density space). In an embodiment, the best-fit representation (e.g., point for one stain, line for two stains, plane for three stains) may be computed using singular value decomposition (SVD). However, it should be understood that any regression method may be used to compute the best-fit representation in the regression space. Next, the algorithm identifies the location of the minimum and maximum values on the main regression line (i.e., the end points of a line segment), and then returns the optical density vectors corresponding to those two locations as the two found stains.

As discussed above, in the case of an image with three stains, the optical density vectors will cluster in a triangle, with the vertices of the triangle representing the optical density values for the three pure stains, and all other optical density vectors (i.e., representing mixtures of the stains) inside of the triangle. In an embodiment, to find this triangle, the algorithm normalizes the optical density vectors to a unit length, calculates the mean of the optical density vectors, centers the data by subtracting the mean from each optical density vector, and then projects the normalized and centered optical density vectors onto a regression plane (e.g., as discussed above).

Subsequently, a best-fit triangle is determined for the optical density vectors in the regression plane. Two approaches for determining this triangle will be described. In the first approach, if it is desired to limit the stains to the stain shades present in the image, the algorithm may use the original version of the N-FINDR algorithm to find three points (representing transformed optical density vectors) that describe the maximum area triangle in regression space that can be formed with the optical density vectors from the image (i.e., the triangle having the largest area within the points corresponding to the optical density vectors). One embodiment of an N-FINDR algorithm is disclosed in M. E. Winter, "N-FINDER: an algorithm for fast autonomous spectral end-member determination in hyperspectral data," Proc. SPIE, vol. 2753, pp. 266-275 (1999), which is hereby incorporated herein by reference. Next, the algorithm identifies the locations of the three vertices of this maximum area triangle, and then returns the three optical density vectors corresponding to those three locations as the three found stains. Since the vertices of the triangle are selected from the optical density points present in the image, a pure stain will be found by this first approach only if that stain exists in a pure, unmixed state somewhere in the image.

Figure 2A:
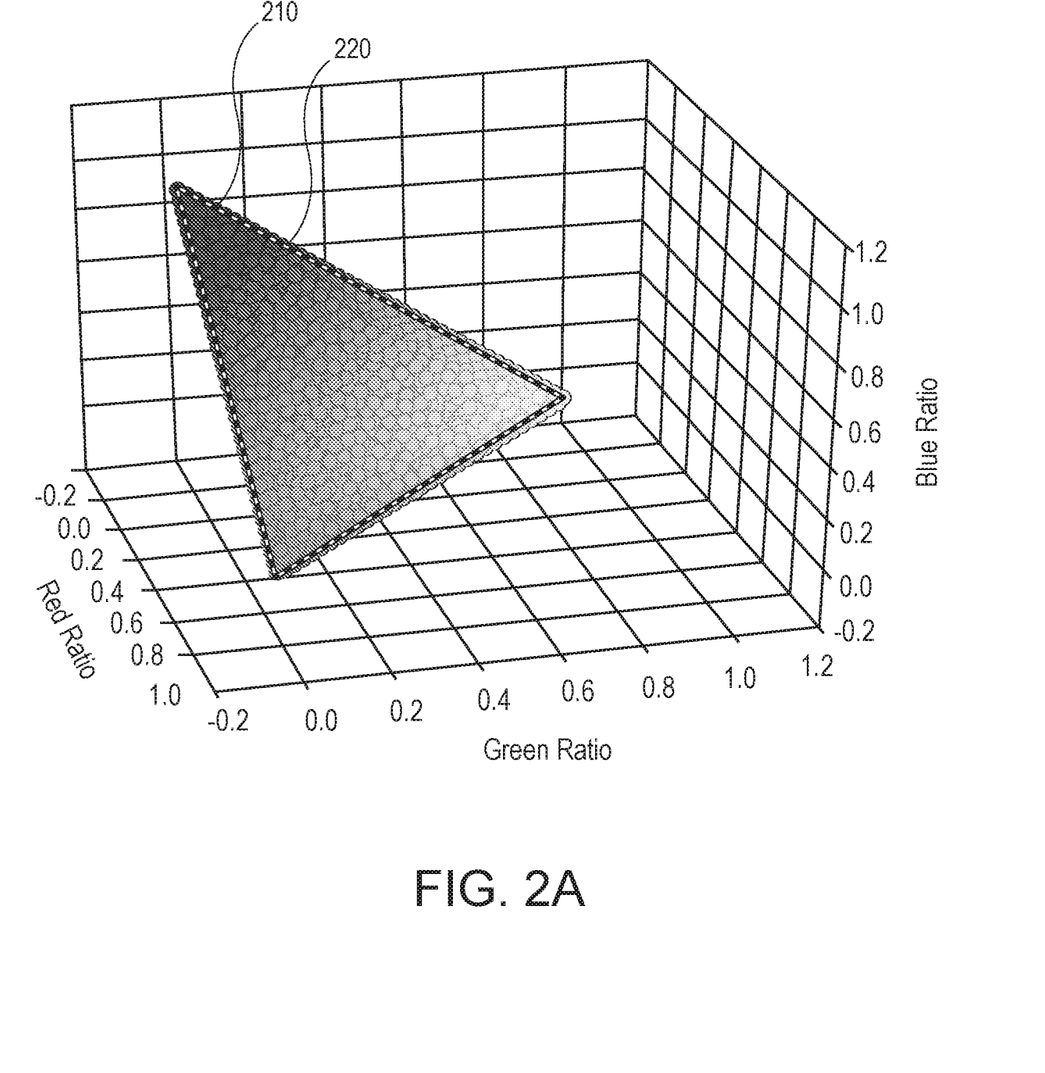
FIGS. 2A and 2B illustrate triangle fitting, according to two different approaches, for an image of a sample having three stains, according to an embodiment.

In the second approach, pure stains can be found even if they do not exist in a pure, unmixed state in the image. In contrast to the first approach, which seeks the maximum area triangle that can be formed with the existing optical density vectors, the second approach seeks the minimum area triangle (i.e., the triangle having the smallest area) that contains all of the transformed optical density vectors. When all three stains are present in their unmixed states in the image, the maximum area triangle 210 and minimum area triangle 220 will coincide, as illustrated in FIG. 2A. However, if one or more of the three stains do not exist in an unmixed state in the image, the first approach will return mixed stains, whereas the second approach can still locate all three of the unmixed stains, provided that one or more pixels representing a mixture of only two stains are present in the image.

According to the second approach, the algorithm computes the convex hull of all of the optical density vectors as points. The convex hull of a set of points is the smallest convex set that contains that set of points, where a convex set is a region such that, for every pair of points within the region, every point on the straight line segment that joins that pair of points is also within the region. Utilization of the convex hull reduces the number of points over which the algorithm must iterate by an order of magnitude.

According to the second approach, once the algorithm has computed the convex hull, the algorithm uses a minimum area triangle method to find the triangle bounding the convex hull with the minimum area (i.e., the minimum area simplex enclosing the convex hull). One embodiment of a minimum area triangle method is disclosed in J. O'Rourke et al., "An optimal algorithm for finding minimal enclosing triangles," J. Algorithms, vol. 7, no. 2, pp. 258-269 (1986), which is hereby incorporated herein by reference. The algorithm may convert the points at the vertices of the triangle back from the regression space to optical density space, and the optical density vectors corresponding to those points are returned as the found stains. Each of the returned optical density vectors will represent a pure stain, even if the image does not comprise any pixels representing a pure stain.

Figure 2B:
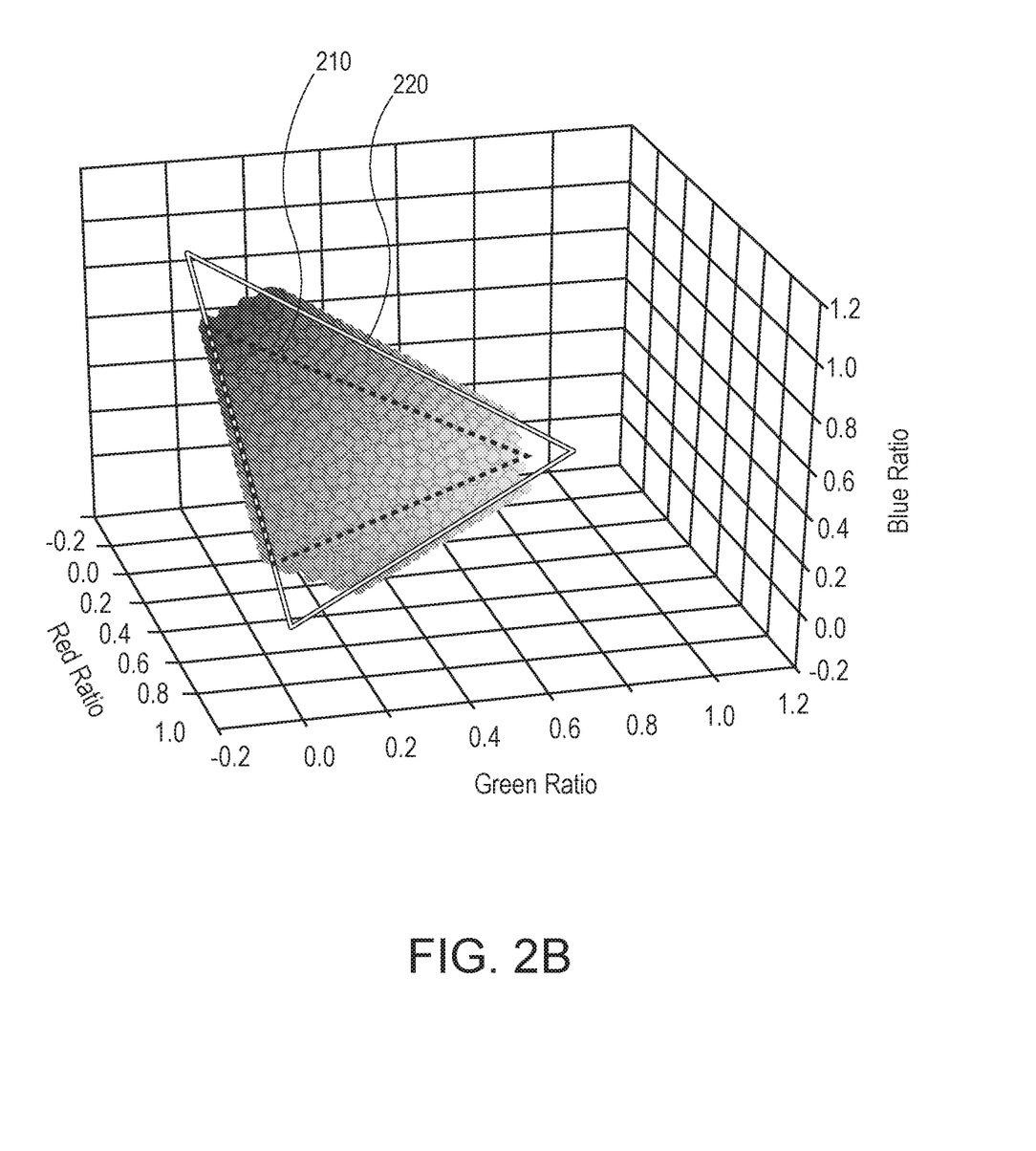

FIGS. 2A and 2B illustrate the differences in triangle fitting between the first approach and the second approach for an image of a sample having three stains, according to an embodiment. For ease of understanding and depiction, optical density vectors have been replaced with stain ratios. As illustrated in FIG. 2A, if regions (e.g., one or more pixels) of unmixed stains are present in an image, both the first approach and second approach return the same triangles. Specifically, the maximum area triangle 210, computed by the first approach, and the minimum area triangle 220, computed by the second approach and containing the convex hull, are identical. The three vertices of both triangles 210 and 220 represent the optical depth vectors for the three pure stains, respectively. In contrast, as illustrated in FIG. 2B, if regions (e.g., one or more pixels) of unmixed stains are not present in the image, the vertices of the maximum area triangle 210, computed by the first approach, will not represent the optical depth vectors for pure stains. Rather, the vertices of the maximum area triangle 210 will represent optical depth vectors for a mixture of two or more of the three stains. However, if region(s) of only two mixed stains are present in the image, the three vertices of the minimum area triangle 220, computed by the second approach and containing the convex hull, will represent the optical depth vectors for the three pure stains, despite the absence of a region of unmixed stains within the image. In other words, the second approach returns optical depth vectors representing pure stains, regardless of whether or not a region of unmixed stains exists within an image, as long as a region of only two mixed stains is present in the image.

Although the algorithm has been described with respect to, at most, three stains or channels, the algorithm can find the optical density vectors for more than three stains, as long as there are regions (i.e., pixel(s)) of the image where three or fewer stains are present. For example, in an image of a sample having four stains A, B, C, and D, the algorithm may find all four stains by analyzing a first region of the image in which only the first three stains A, B, and C are present (as discussed above with respect to the analysis of three stains), and separately operating on a second region of the image in which only the last three stains, B, C, and D are present (again, as discussed above with respect to the analysis of three stains). The first and second regions may be selected manually by a user or determined automatically by the algorithm.

Figure 3:
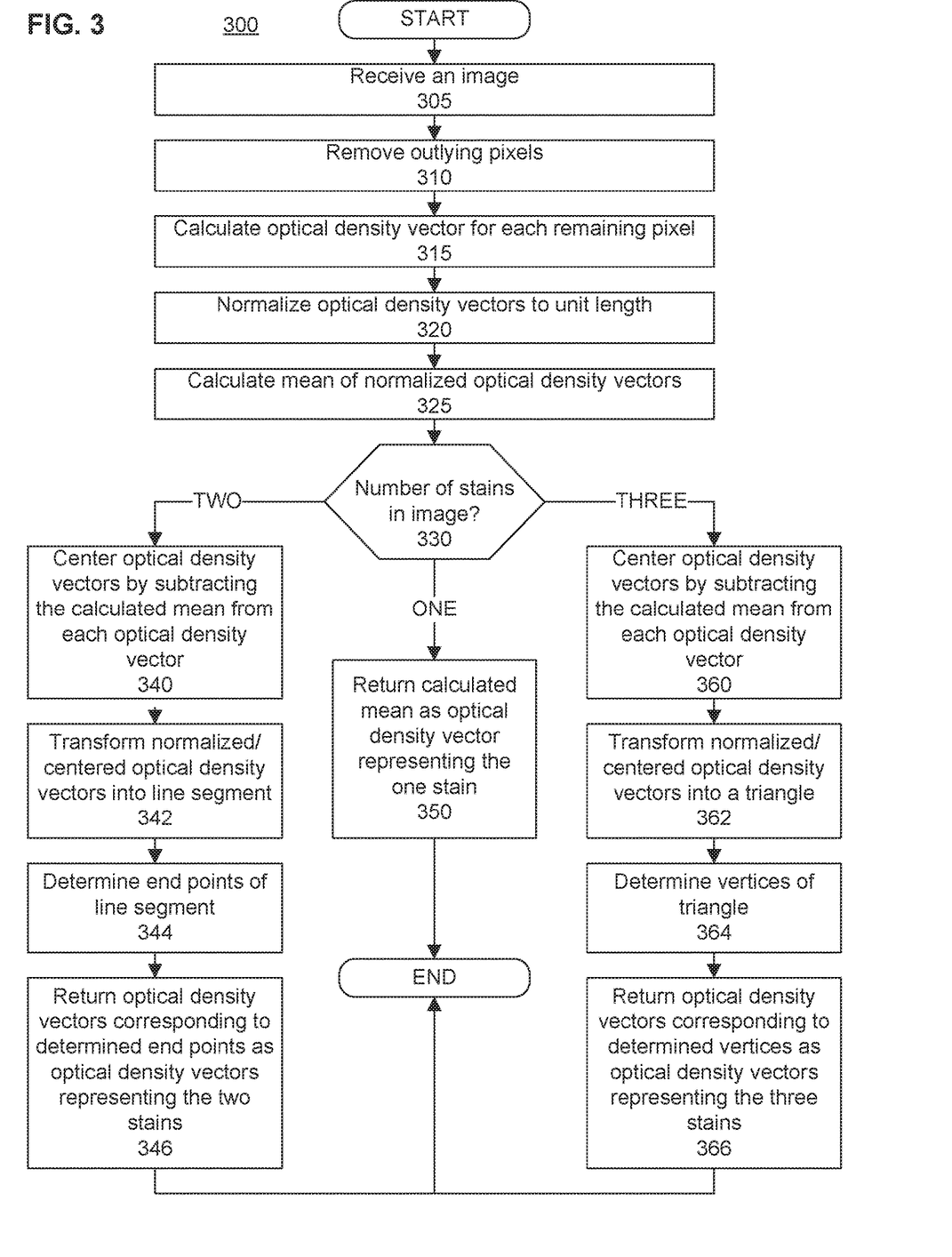
FIG. 3 illustrates a process for determining the optical density vectors for stains in an image, according to an embodiment.

FIG. 3 illustrates the above described algorithm as process 300, according to an embodiment. In step 305, an image is received. It should be understood that this image may be an image of a complete sample or a portion of a sample, including a portion of an image of a complete sample. The sample may be a tissue sample or other sample on a microscope slide that has been scanned by an image acquisition device, such as a slide scanner, and process 300 may receive the image, either directly or indirectly and either locally or remotely, from the image acquisition device. It should also be understood that process 300 may be implemented in software stored in a memory of the slide scanner and/or hardware housed within an image acquisition device, such as a slide scanner, or may be implemented in software and/or hardware in a system that is separate from any particular image acquisition device.

In step 310, outlying pixels within the image may be removed from consideration. For instance, pixels that are darker than a first predefined threshold and/or pixels that are brighter than a second predefined threshold may be removed from consideration. Thus, only pixels within a predefined range of darkness/brightness may be considered by the subsequent steps of process 300.

In step 315, the optical density vector for each remaining pixel is calculated. Then, in step 320, the optical density vectors calculated in step 315 are normalized to a unit length. In step 325, the mean of the normalized optical density vectors is calculated.

As represented by step 330, the next step in process 300 depends on how many stains are present in the image. The number of stains may be an input to process 300 that is provided by a user (e.g., via a user interface) or determined automatically (e.g., via another process, as a fixed or configurable system setting, etc.).

If only one stain is present in the image, the mean of the normalized optical density vectors, calculated in step 325, is returned as the optical density vector representing the one stain in the image.

If two stains are present in the image, in step 340, the optical density vectors are centered by subtracting the mean of the normalized optical density vectors, calculated in step 325, from each optical density vector from the image. In step 342, the normalized and centered optical density vectors are transformed from a two-dimensional optical density space into a line segment, having two end points, in one-dimensional regression space. In step 344, these two end points of the line segment are determined. Finally, in step 346, the two end points may be transformed from regression space back into optical density space to identify the two optical density vectors corresponding to the two end points. These two optical density vectors are returned as the optical density vectors representing the two stains in the image.

If three stains are present in the image, in step 360, the optical density vectors are centered by subtracting the mean of the normalized optical density vectors, calculated in step 325, from each optical density vector. Step 360 may be identical or similar to step 340. In step 362, the normalized and centered optical density vectors are transformed from a three-dimensional optical density space into a triangle, having three vertices, in two-dimensional regression space. Step 362 may be similar to step 342, but using a projection from three dimensions into two dimensions, instead of a projection from two dimensions into one dimension. In step 364, the three vertices of the triangle are determined. Finally, in step 366, the three vertices may be transformed from regression space back into optical density space to identify the three optical density vectors corresponding to the three vertices. These three optical density vectors are returned as the optical density vectors representing the three stains in the image. It should be understood that these steps (i.e., steps 340-346 and 360-366) may be generalized for any N number of stains by generalizing the transformations in steps 342 and 362 to an N-dimensional space.

Figure 4A:
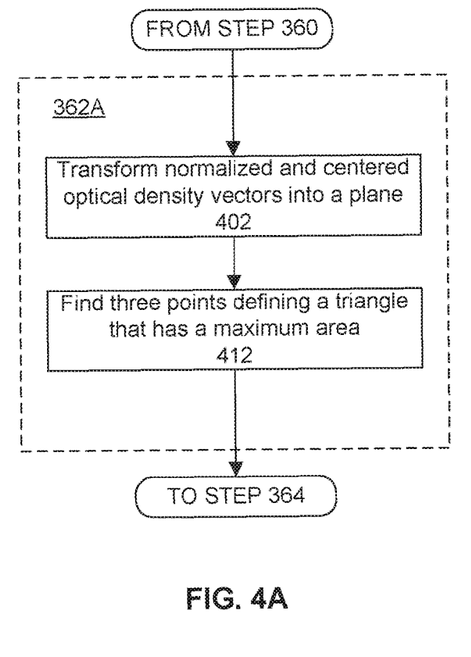
FIGS. 4A and 4B illustrate two different approaches to implementing step 362 in process 300 in FIG. 3, according to an embodiment.

FIG. 4A illustrates step 362 of process 300, using a first approach 362A, according to an embodiment. In step 402 of the first approach 362A, the normalized and centered optical density vectors from step 360 in process 300 are transformed from a three-dimensional optical density space into a plane in two-dimensional regression space. Then, in step 412 of the first approach 362A, three points are found in the regression space that form a triangle having a maximum area, for example, according to the N-FINDR algorithm. The first approach 362A then proceeds to step 364 in process 300.

Figure 4B:
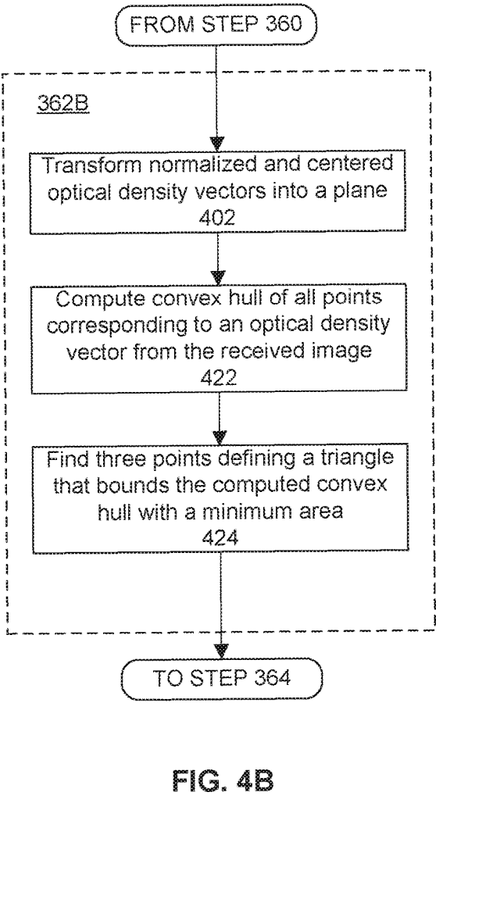

FIG. 4B illustrates step 362 of process 300, using a second approach 362B, according to an embodiment. In step 402 of the second approach 362B, the normalized and centered optical density vectors from step 360 in process 300 are transformed from a three-dimensional optical density space into a plane in two-dimensional regression space. Step 402 in the second approach 362B may be identical or similar to step 402 in the first approach 362A. In step 422 of the second approach 362B, the convex hull of all points in the two-dimensional regression space corresponding to an optical density vector of a pixel in the image, received in step 305 of process 300, is computed. Then, in step 424 of the second approach 362B, three points are found in the two-dimensional regression space that form a triangle that bounds the convex hull, computed in step 422, with a minimum area, for example, using a minimum area triangle method. The second approach 362B then proceeds to step 364 in process 300.

In an embodiment, in addition to returning the optical density vectors for the found stain(s), the algorithm can return a measure of stain separation quality and/or a measure of image reconstruction quality. The stain separation quality measures how well the stains are separated within a given image region. In an embodiment, the stain separation quality is determined by first converting the optical density values for each pixel in the image to barycentric coordinates with respect to the optical density vectors representing the found stains. In barycentric coordinates, the contribution of each optical density vector representing a found stain to each pixel may be indicated as a value from 0.0 to 1.0. For example, for an image having a first, second, and third stain, a pixel containing only the first stain will have coordinates (1.0, 0.0, 0.0), a pixel containing only the second stain will have coordinates (0.0, 1.0, 0.0), and a pixel containing only the third stain will have coordinates (0.0, 0.0, 1.0). In general, a pixel that contains primarily one stain will have one of its coordinates close to 1.0 and its other two coordinates close to 0.0, whereas a pixel that contains an equal mixture of stains will have multiple coordinates that are equal in magnitude. The stain separation quality may be computed by calculating the average over all of the pixels of the difference between the maximum barycentric coordinate and the sum of the other two barycentric coordinates, with a restriction that any difference lower than 0.0 is set to 0.0. This measure will return a number between 0.0 and 1.0, where 0.0 indicates that the stains are not separated at all (i.e., mixed) and 1.0 indicates that the stains are completely separated (i.e., pure).

The image reconstruction quality measures the percentage of pixels in the image that can be reconstructed by the returned optical density vector(s), which represent the stain(s) found by the algorithm. In an embodiment, the image reconstruction quality is determined by first expressing the normalized optical density vector for each pixel as a linear combination of the found stain vectors. Next, a measure of the difference between the computed and actual optical density vectors is computed (e.g., a mean distance), or the mean-square error can be computed. To obtain a measure of image reconstruction quality, the normalized mean error E can be calculated and expressed as one minus the normalized mean error (i.e., 1−E). For the normalized mean distance, an image reconstruction quality of 95% or more (i.e., indicating an error of 5% or less) has been found, empirically, to represent a desirable image reconstruction quality. In an embodiment, the measures of stain separation quality and image reconstruction quality could be combined (e.g., by weighted average) into an aggregate measure of stain quality.

These quality measures may be used internally by user-facing algorithms that utilize the disclosed stain-finding algorithm (e.g., the nuclear bright-field algorithm). Alternatively or additionally, the developers of user-facing algorithms may choose to display one or both of these quality measures to the user (e.g., within a user interface), possibly in a combined fashion, as an overall indicator of the selected image sample suitability for stain separation.

Example Scanner Device

FIG. 5A is a block diagram illustrating an example scanner system 550 according to an embodiment of the invention. In the illustrated embodiment, the scanner system 550 comprises one or more processors 555, one or more memories 565, one or more motion controllers 570, one or more interface systems 575, one or more movable stages 580 that each support one or more glass slides 585 with one or more samples 590, one or more illumination systems 595 that illuminate the sample, one or more objective lenses 600 that each define an optical path 605 that travels along an optical axis, one or more objective lens positioners 630, one or more optional epi-illumination systems 635 (e.g., included in a fluorescence scanner system), one or more focusing optics 610, one or more line scan cameras 615 and/or one or more area scan cameras 620, each of which define a separate field of view 625 on the sample 590 and/or glass slide 585. The various elements of the scanner system 550 are communicatively coupled via one or more communication busses 560. Although there may be one or more of each of the various elements of the scanner system 550, for simplicity in the description that follows, these elements will be described in the singular except when needed to be described in the plural to convey the appropriate information.

The one or more processors 555 may include, for example, a central processing unit ("CPU") and a separate graphics processing unit ("GPU") capable of processing instructions in parallel or the one or more processors 555 may include a multicore processor capable of processing instructions in parallel. Additional separate processors may also be provided to control particular components or perform particular functions such as image processing. For example, additional processors may include an auxiliary processor to manage data input, an auxiliary processor to perform floating point mathematical operations, a special-purpose processor having an architecture suitable for fast execution of signal processing algorithms (e.g., digital signal processor), a slave processor subordinate to the main processor (e.g., back-end processor), an additional processor for controlling the line scan camera 615, the stage 580, the objective lens 225 and/or a display (not shown). Such additional processors may be separate discrete processors or may be integrated with the processor 555.

The memory 565 provides storage of data and instructions for programs that can be executed by the processor 555. The memory 565 may include one or more volatile and persistent computer-readable storage mediums that store the data and instructions, for example, a random access memory, a read only memory, a hard disk drive, removable storage drive, and the like. The processor 555 is configured to execute instructions that are stored in memory 565 and communicate via communication bus 560 with the various elements of the scanner system 550 to carry out the overall function of the scanner system 550.

The one or more communication busses 560 may include a communication bus 560 that is configured to convey analog electrical signals and may include a communication bus 560 that is configured to convey digital data. Accordingly, communications from the processor 555, the motion controller 570, and/or the interface system 575 via the one or more communication busses 560 may include both electrical signals and digital data. The processor 555, the motion controller 570, and/or the interface system 575 may also be configured to communicate with one or more of the various elements of the scanning system 550 via a wireless communication link.

The motion control system 570 is configured to precisely control and coordinate XYZ movement of the stage 580 and the objective lens 600 (e.g., via the objective lens positioner 630). The motion control system 570 is also configured to control movement of any other moving part in the scanner system 550. For example, in a fluorescence scanner embodiment, the motion control system 570 is configured to coordinate movement of optical filters and the like in the epi-illumination system 635.

The interface system 575 allows the scanner system 550 to interface with other systems and human operators. For example, the interface system 575 may include a user interface to provide information directly to an operator and/or to allow direct input from an operator. The interface system 575 is also configured to facilitate communication and data transfer between the scanning system 550 and one or more external devices that are directly connected (e.g., a printer, removable storage medium) or external devices such as an image server system, an operator station, a user station, and an administrative server system that are connected to the scanner system 550 via a network (not shown).

The illumination system 595 is configured to illuminate a portion of the sample 590. The illumination system may include, for example, a light source and illumination optics. The light source could be a variable intensity halogen light source with a concave reflective mirror to maximize light output and a KG-1 filter to suppress heat. The light source could also be any type of arc-lamp, laser, or other source of light. In one embodiment, the illumination system 595 illuminates the sample 590 in transmission mode such that the line scan camera 615 and/or area scan camera 620 sense optical energy that is transmitted through the sample 590. Alternatively, or in combination, the illumination system 595 may also be configured to illuminate the sample 590 in reflection mode such that the line scan camera 615 and/or area scan camera 620 sense optical energy that is reflected from the sample 590. Overall, the illumination system 595 is configured to be suitable for interrogation of the microscopic sample 590 in any known mode of optical microscopy.

In one embodiment, the scanner system 550 optionally includes an epi-illumination system 635 to optimize the scanner system 550 for fluorescence scanning. Fluorescence scanning is the scanning of samples 590 that include fluorescence molecules, which are photon sensitive molecules that can absorb light at a specific wavelength (excitation). These photon sensitive molecules also emit light at a higher wavelength (emission). Because the efficiency of this photoluminescence phenomenon is very low, the amount of emitted light is often very low. This low amount of emitted light typically frustrates conventional techniques for scanning and digitizing the sample 590 (e.g., transmission mode microscopy). Advantageously, in an optional fluorescence scanner system embodiment of the scanner system 550, use of a line scan camera 615 that includes multiple linear sensor arrays (e.g., a time delay integration (TDI) line scan camera) increases the sensitivity to light of the line scan camera by exposing the same area of the sample 590 to each of the multiple linear sensor arrays of the line scan camera 615. This is particularly useful when scanning faint fluorescence samples with low emitted light.

Accordingly, in a fluorescence scanner system embodiment, the line scan camera 615 is preferably a monochrome TDI line scan camera. Advantageously, monochrome images are ideal in fluorescence microscopy because they provide a more accurate representation of the actual signals from the various channels present on the sample. As will be understood by those skilled in the art, a fluorescence sample 590 can be labeled with multiple florescence dyes that emit light at different wavelengths, which are also referred to as "channels."

Furthermore, because the low and high end signal levels of various fluorescence samples present a wide spectrum of wavelengths for the line scan camera 615 to sense, it is desirable for the low and high end signal levels that the line scan camera 615 can sense to be similarly wide. Accordingly, in a fluorescence scanner embodiment, a line scan camera 615 used in the fluorescence scanning system 550 is a monochrome 10 bit 64 linear array TDI line scan camera. It should be noted that a variety of bit depths for the line scan camera 615 can be employed for use with a fluorescence scanner embodiment of the scanning system 550.

The movable stage 580 is configured for precise XY movement under control of the processor 555 or the motion controller 570. The movable stage may also be configured for movement in Z under control of the processor 555 or the motion controller 570. The moveable stage is configured to position the sample in a desired location during image data capture by the line scan camera 615 and/or the area scan camera. The moveable stage is also configured to accelerate the sample 590 in a scanning direction to a substantially constant velocity and then maintain the substantially constant velocity during image data capture by the line scan camera 615. In one embodiment, the scanner system 550 may employ a high precision and tightly coordinated XY grid to aid in the location of the sample 590 on the movable stage 580. In one embodiment, the movable stage 580 is a linear motor based XY stage with high precision encoders employed on both the X and the Y axis. For example, very precise nanometer encoders can be used on the axis in the scanning direction and on the axis that is in the direction perpendicular to the scanning direction and on the same plane as the scanning direction. The stage is also configured to support the glass slide 585 upon which the sample 590 is disposed.

The sample 590 can be anything that may be interrogated by optical microscopy. For example, a glass microscope slide 585 is frequently used as a viewing substrate for specimens that include tissues and cells, chromosomes, DNA, protein, blood, bone marrow, urine, bacteria, beads, biopsy materials, or any other type of biological material or substance that is either dead or alive, stained or unstained, labeled or unlabeled. The sample 590 may also be an array of any type of DNA or DNA-related material such as cDNA or RNA or protein that is deposited on any type of slide or other substrate, including any and all samples commonly known as a microarrays. The sample 590 may be a microtiter plate, for example a 96-well plate. Other examples of the sample 590 include integrated circuit boards, electrophoresis records, petri dishes, film, semiconductor materials, forensic materials, or machined parts.

Objective lens 600 is mounted on the objective positioner 630 which, in one embodiment, may employ a very precise linear motor to move the objective lens 600 along the optical axis defined by the objective lens 600. For example, the linear motor of the objective lens positioner 630 may include a 50 nanometer encoder. The relative positions of the stage 580 and the objective lens 600 in XYZ axes are coordinated and controlled in a closed loop manner using motion controller 570 under the control of the processor 555 that employs memory 565 for storing information and instructions, including the computer-executable programmed steps for overall scanning system 550 operation.

In one embodiment, the objective lens 600 is a plan apochromatic ("APO") infinity corrected objective with a numerical aperture corresponding to the highest spatial resolution desirable, where the objective lens 600 is suitable for transmission mode illumination microscopy, reflection mode illumination microscopy, and/or epi-illumination mode fluorescence microscopy (e.g., an Olympus 40×, 0.75 NA or 20×, 0.75 NA). Advantageously, objective lens 600 is capable of correcting for chromatic and spherical aberrations. Because objective lens 600 is infinity corrected, focusing optics 610 can be placed in the optical path 605 above the objective lens 600 where the light beam passing through the objective lens becomes a collimated light beam. The focusing optics 610 focus the optical signal captured by the objective lens 600 onto the light-responsive elements of the line scan camera 615 and/or the area scan camera 620 and may include optical components such as filters, magnification changer lenses, etc. The objective lens 600 combined with focusing optics 610 provides the total magnification for the scanning system 550. In one embodiment, the focusing optics 610 may contain a tube lens and an optional 2× magnification changer. Advantageously, the 2× magnification changer allows a native 20× objective lens 600 to scan the sample 590 at 40× magnification.

The line scan camera 615 comprises at least one linear array of picture elements ("pixels"). The line scan camera may be monochrome or color. Color line scan cameras typically have at least three linear arrays, while monochrome line scan cameras may have a single linear array or plural linear arrays. Any type of singular or plural linear array, whether packaged as part of a camera or custom-integrated into an imaging electronic module, can also be used. For example, 3 linear array ("red-green-blue" or "RGB") color line scan camera or a 96 linear array monochrome TDI may also be used. TDI line scan cameras typically provide a substantially better signal-to-noise ratio ("SNR") in the output signal by summing intensity data from previously imaged regions of a specimen, yielding an increase in the SNR that is in proportion to the square-root of the number of integration stages. TDI line scan cameras comprise multiple linear arrays, for example, TDI line scan cameras are available with 24, 32, 48, 64, 96, or even more linear arrays. The scanner system 550 also supports linear arrays that are manufactured in a variety of formats including some with 512 pixels, some with 1024 pixels, and others having as many as 4096 pixels. Similarly, linear arrays with a variety of pixel sizes can also be used in the scanner system 550. The salient requirement for the selection of any type of line scan camera 615 is that the motion of the stage 580 can be synchronized with the line rate of the line scan camera 615 so that the stage 580 can be in motion with respect to the line scan camera 615 during the digital image capture of the sample 590.

The image data generated by the line scan camera 615 is stored a portion of the memory 565 and processed by the processor 555 to generate a contiguous digital image of at least a portion of the sample 590. The contiguous digital image can be further processed by the processor 555 and the revised contiguous digital image can also be stored in the memory 565.

In an embodiment with two or more line scan cameras 615, at least one of the line scan cameras 615 can be configured to function as a focusing sensor that operates in combination with at least one of the line scan cameras that is configured to function as an imaging sensor. The focusing sensor can be logically positioned on the same optical path as the imaging sensor or the focusing sensor may be logically positioned before or after the imaging sensor with respect to the scanning direction of the scanner system 550. In such an embodiment with at least one line scan camera 615 functioning as a focusing sensor, the image data generated by the focusing sensor is stored a portion of the memory 565 and processed by the one or more processors 555 to generate focus information to allow the scanner system 550 to adjust the relative distance between the sample 590 and the objective lens 600 to maintain focus on the sample during scanning.

In operation, the various components of the scanner system 550 and the programmed modules stored in memory 565 enable automatic scanning and digitizing of the sample 590, which is disposed on a glass slide 585. The glass slide 585 is securely placed on the movable stage 580 of the scanner system 550 for scanning the sample 590. Under control of the processor 555, the movable stage 580 accelerates the sample 590 to a substantially constant velocity for sensing by the line scan camera 615, where the speed of the stage is synchronized with the line rate of the line scan camera 615. After scanning a stripe of image data, the movable stage 580 decelerates and brings the sample 590 to a substantially complete stop. The movable stage 580 then moves orthogonal to the scanning direction to position the sample 590 for scanning of a subsequent stripe of image data, e.g., an adjacent stripe. Additional stripes are subsequently scanned until an entire portion of the sample 590 or the entire sample 590 is scanned.

For example, during digital scanning of the sample 590, a contiguous digital image of the sample 590 is acquired as a plurality of contiguous fields of view that are combined together to form an image strip. A plurality of adjacent image strips are similarly combined together to form a contiguous digital image of a portion or the entire sample 590. The scanning of the sample 590 may include acquiring vertical image strips or horizontal image strips. The scanning of the sample 590 may be either top-to-bottom, bottom-to-top, or both (bi-directional) and may start at any point on the sample. Alternatively, the scanning of the sample 590 may be either left-to-right, right-to-left, or both (bi-directional) and may start at any point on the sample. Additionally, it is not necessary that image strips be acquired in an adjacent or contiguous manner. Furthermore, the resulting image of the sample 590 may be an image of the entire sample 590 or only a portion of the sample 590.

In one embodiment, computer executable instructions (e.g., programmed modules and software) are stored in the memory 565 and when executed, enable the scanning system 550 to perform the various functions described herein. In this description, the term "computer-readable storage medium" is used to refer to any media used to store and provide computer executable instructions to the scanning system 550 for execution by the processor 555. Examples of these media include memory 565 and any removable or external storage medium (not shown) communicatively coupled with the scanning system 550 either directly or indirectly, for example via a network (not shown).

Figure 5B:
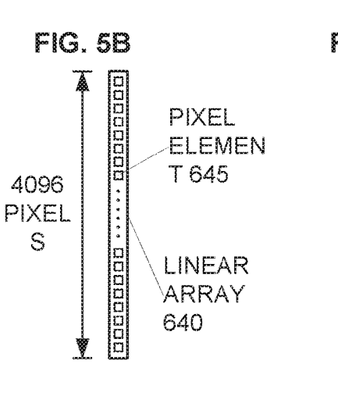

FIG. 5B illustrates a line scan camera having a single linear array 640, which may be implemented as a charge coupled device ("CCD") array. The single linear array 640 comprises a plurality of individual pixels 645. In the illustrated embodiment, the single linear array 640 has 4096 pixels. In alternative embodiments, linear array 640 may have more or fewer pixels. For example, common formats of linear arrays include 512, 1024 and 4096 pixels. The pixels 645 are arranged in a linear fashion to define a field of view 625 for the linear array 640. The size of the field of view varies in accordance with the magnification of the scanner system 550.

Figures 5C, 5D:
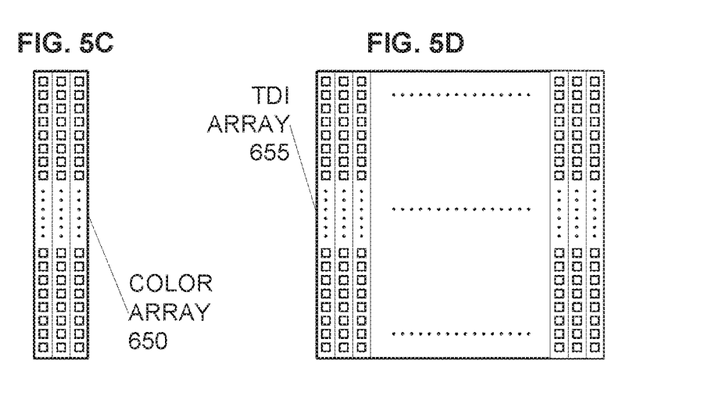

FIG. 5C illustrates a line scan camera having three linear arrays, each of which may be implemented as a CCD array. The three linear arrays combine to form a color array 650. In one embodiment, each individual linear array in the color array 650 detects a different color intensity, for example red, green, or blue. The color image data from each individual linear array in the color array 650 is combined to form a single field of view 625 of color image data.

FIG. 5D illustrates a line scan camera having a plurality of linear arrays, each of which may be implemented as a CCD array. The plurality of linear arrays combine to form a TDI array 655. Advantageously, a TDI line scan camera may provide a substantially better SNR in its output signal by summing intensity data from previously imaged regions of a specimen, yielding an increase in the SNR that is in proportion to the square-root of the number of linear arrays (also referred to as integration stages). A TDI line scan camera may comprise a larger variety of numbers of linear arrays, for example common formats of TDI line scan cameras include 24, 32, 48, 64, 96, 120 and even more linear arrays.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit, or step is for ease of description. Specific functions or steps can be moved from one module, block, or circuit to another without departing from the invention.

Moreover, the various illustrative logical blocks, modules, functions, and methods described in connection with the embodiments disclosed herein can be implemented or performed with a general purpose processor, a digital signal processor (DSP), an ASIC, FPGA, or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such that the processor can read information from, and write information to, the storage medium. In the alternative, the storage medium can be integral to the processor. The processor and the storage medium can also reside in an ASIC.

Any of the software components described herein may take a variety of forms. For example, a component may be a stand-alone software package, or it may be a software package incorporated as a "tool" in a larger software product. It may be downloadable from a network, for example, a website, as a stand-alone product or as an add-in package for installation in an existing software application. It may also be available as a client-server software application, as a web-enabled software application, and/or as a mobile application.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

What is claimed is:

1. A system for analyzing an image of a tissue sample obtained from an image acquisition device, the image comprising a plurality of pixels and the tissue sample having one or more stains, the system comprising:
 a memory configured to store the image of the tissue sample obtained from the image acquisition device; and
 at least one hardware processor coupled to the memory and configured to:
 receive the image of the tissue sample, the image comprising outlier pixels that would result in inaccurate optical density,
 for each of the plurality of pixels of the image:
 compare a color value of the pixel to a first threshold, the first threshold toward the pure black end of a brightness spectrum,
 compare the color value of the pixel to a second threshold, the second threshold toward the pure white end of the brightness spectrum, the second threshold being greater than the first threshold,
 determine if the color value of the pixel is less than the first threshold or greater than the second threshold, and
 exclude each pixel with the color value of less than the first threshold or greater than the second threshold from further analysis, determine an optical density for each pixel that is not excluded, wherein the optical density comprises an optical density value for each of the one or more stains, identify an optical density for each of the one or more stains based on the optical density for each pixel that is not excluded, normalize the optical density for each pixel that is not excluded, calculate a mean of the optical densities, wherein when the number of the one or more stains is two or more, the hardware processor is further configured to, for the optical density of each pixel that is not excluded, center the optical density by subtracting the calculated mean from the optical density, and quantify an amount of each of the one or more stains based on the identified optical densities for the one or more stains.

2. The system of claim 1, wherein when the number of the one or more stains is two, the optical density for each pixel is represented as a point in an optical density space that two dimensions, and the hardware processor is further configured to:

transform the normalized and centered optical density for each pixel that is not excluded into a line segment in a one-dimensional space, and identify an optical density corresponding to each endpoint of the line segment, wherein the identifying of the optical density for each of the one or more stains is further based on the optical density corresponding to each endpoint of the line segment.

3. The system of claim 1, wherein when the number of the one or more stains is three, the optical density for each pixel is represented as a point in an optical density space that has three dimensions, and the hardware processor is further configured to:

transform the normalized and centered optical density for each pixel that is not excluded into a triangle in a two-dimensional space, and identify an optical density corresponding to each vertex of the triangle, wherein the identifying of the optical density for each of the one or more stains is further based on the optical density corresponding to each vertex of the triangle.

4. The system of claim 3, wherein the hardware processor is further configured to:

transform the normalized and centered optical density for each pixel that is not excluded into a point in the two-dimensional space, compute a convex hull of the points in the two-dimensional space, and determine the triangle as a triangle that bounds the convex hull with a minimum area.

5. The system of claim 3, wherein the hardware processor is further configured to:

transform the normalized and centered optical density for each pixel that is not excluded into a point in the two-dimensional space, and determine the triangle as a triangle that, within the projected points, has a maximum area.

6. The system of claim 1, wherein when the number of the one or more stains is one, the hardware processor is further configured to use the calculated mean of the optical densities for the optical density of the stain.

7. The system of claim 1, wherein the hardware processor is further configured to:

transform optical density for each pixel that is not excluded into a point in an optical density space, compute a convex hull of the transformed points, and determine a simplex, within the transformed points, that has a maximum area.

8. The system of claim 1, wherein the hardware processor is further configured to:

generate a stain quality measure comprising one of more of: a measure of stain separation quality and a measure of image reconstruction quality.

9. A method comprising using at least one hardware processor to:

receive an image of a tissue sample obtained from an image acquisition device, the image comprising a plurality of pixels and the tissue sample having one or more stains;

for each of the plurality of pixels of the image:

compare a color value of the pixel to a first threshold toward the pure black end of a brightness spectrum, compare the color value of the pixel to a second threshold, the second threshold being toward the pure white end of the brightness spectrum, the second threshold being greater than the first threshold, determine that a pixel is an outlier if the color value of the pixel is less than the first threshold or greater than the second threshold, and exclude only outlier pixels from further analysis;

determine an optical density for each pixel that is not excluded, wherein the optical density comprises an optical density value for each of the one or more stains;

identify an optical density for each of the one or more stains based on the optical density for each pixel that is not excluded, normalize the optical density for each pixel that is not excluded, calculate a mean of the optical densities, wherein when the number of the one or more stains is two or more, for the optical density of each pixel that is not excluded, centering the optical density by subtracting the calculated mean from the optical density, and quantify an amount of each of the one or more stains based on the identified optical densities for the one or more stains.

10. The method of claim 9, further comprising, when the number of the one or more stains is two, the optical density for each pixel is represented as a point in an optical density space that two dimensions:

transforming the normalized and centered optical density for each pixel that is not excluded into a line segment in a one-dimensional space; and identifying an optical density corresponding to each endpoint of the line segment, wherein the identifying of the optical density for each of the one or more stains is further based on the optical density corresponding to each endpoint of the line segment.

11. The method of claim 9, further comprising, when the number of the one or more stains is three, the optical density for each pixel is represented as a point in an optical density space that has three dimensions:

transforming the normalized and centered optical density for each pixel that is not excluded into a triangle in a two-dimensional space; and identifying an optical density corresponding to each vertex of the triangle, wherein the identifying of the optical density for each of the one or more stains is further based on the optical density corresponding to each vertex of the triangle.

12. A non-transitory computer-readable medium having instructions stored thereon that, when executed by a processor, cause the processor to:

receive an image of a tissue sample obtained from an image acquisition device, the image comprising a plurality of pixels and the tissue sample having one or more stains;

for each of the plurality of pixels of the image:

compare a color value of the pixel to a first, dark noise threshold, compare the color value of the pixel to a second, bright noise threshold, the second threshold being greater than the first threshold, determine if the color value of the pixel is darker than the first noise threshold or brighter than the second noise threshold, and exclude each pixel with the color value of darker than the first noise threshold or brighter than the second noise threshold from further analysis;

determine an optical density for each pixel that is not excluded, wherein the optical density comprises an optical density value for each of the one or more stains;

identify an optical density for each of the one or more stains based on the optical density for each pixel that is not excluded, normalize the optical density for each pixel that is not excluded, calculate a mean of the optical densities, wherein when the number of the one or more stains is two or more, for the optical density of each pixel that is not excluded, center the optical density by subtracting the calculated mean from the optical density, and quantify an amount of each of the one or more stains based on the identified optical densities for the one or more stains.

13. The non-transitory computer-readable medium of claim 12, further having stored thereon instructions that, when executed by the processor, cause the processor to, when the number of the one or more stains is two, the optical density for each pixel is represented as a point in an optical density space that two dimensions:

transform the normalized and centered optical density for each pixel that is not excluded into a line segment in a one-dimensional space; and identify an optical density corresponding to each endpoint of the line segment, wherein the identifying of the optical density for each of the one or more stains is further based on the optical density corresponding to each endpoint of the line segment.

14. The non-transitory computer-readable medium of claim 12, further having stored thereon instructions that, when executed by the processor, cause the processor to, when the number of the one or more stains is three, the optical density for each pixel is represented as a point in an optical density space that has three dimensions:

transform the normalized and centered optical density for each pixel that is not excluded into a triangle in a two-dimensional space; and identify an optical density corresponding to each vertex of the triangle, wherein the identifying of the optical density for each of the one or more stains is further based on the optical density corresponding to each vertex of the triangle.

* * * * *